(12) United States Patent
Günther et al.

(10) Patent No.: US 10,632,582 B2
(45) Date of Patent: Apr. 28, 2020

(54) METHOD FOR MACHINING WORKPIECES AND MACHINE TOOL FOR CARRYING OUT THE METHOD

(71) Applicant: STAMA Maschinenfabrik GmbH, Schlierbach (DE)

(72) Inventors: Kai Günther, Esslingen (DE); Thomas Boehm, Eislingen (DE); Frank Mueller, Stuttgart (DE)

(73) Assignee: STAMA Maschinenfabrik GmbH, Schlierbach (DE)

( * ) Notice: Subject to any disclaimer, the term of this patent is extended or adjusted under 35 U.S.C. 154(b) by 0 days.

(21) Appl. No.: 16/033,461

(22) Filed: Jul. 12, 2018

(65) Prior Publication Data
US 2019/0015942 A1    Jan. 17, 2019

(30) Foreign Application Priority Data

Jul. 13, 2017    (DE) .................. 10 2017 115 734

(51) Int. Cl.
*B23Q 7/04* (2006.01)
*B23Q 3/155* (2006.01)
(Continued)

(52) U.S. Cl.
CPC ............ *B23Q 7/045* (2013.01); *B23B 1/00* (2013.01); *B23B 3/065* (2013.01); *B23Q 3/155* (2013.01);
(Continued)

(58) Field of Classification Search
CPC ............ Y10T 483/16; Y10T 483/1705; Y10T 483/171; B23Q 7/045; B23Q 7/046;
(Continued)

(56) References Cited

U.S. PATENT DOCUMENTS

| 4,716,647 A | 1/1988 | Winkler et al. |
| 5,803,886 A * | 9/1998 | Schweizer ............. B23Q 7/045 483/31 |

(Continued)

FOREIGN PATENT DOCUMENTS

| DE | 3620343 C2 | 8/1993 |
| DE | 4228708 A1 | 3/1994 |

(Continued)

OTHER PUBLICATIONS

European Search Report for corresponding European Application No. 18181327.0, dated Jan. 4, 2019.

*Primary Examiner* — Erica E Cadugan
(74) *Attorney, Agent, or Firm* — Jason H. Vick; Sheridan Ross, PC

(57) ABSTRACT

A machine tool has a clamping device for clamping in workpieces to be machined, a work spindle which is movable relative to the clamping device, a tool magazine wherein tools for machining the workpieces are held available, the tools being selectively clamped into the work spindle, and a spindle gripper to be selectively clamped into the work spindle and being self-holding in its gripping position, said spindle gripper being held available in the tool magazine and being movable between a transfer position to the work spindle and an unloading station in which the spindle gripper releases a work piece remnant received from the clamping device.

11 Claims, 9 Drawing Sheets

(51) Int. Cl.
*B23Q 3/157* (2006.01)
*B23B 1/00* (2006.01)
*B23B 3/22* (2006.01)
*B23B 3/06* (2006.01)
*B23B 13/02* (2006.01)
*B23C 1/12* (2006.01)

(52) U.S. Cl.
CPC ...... *B23Q 3/15503* (2016.11); *B23Q 3/15506* (2013.01); *B23Q 3/15566* (2013.01); *B23Q 3/15706* (2013.01); *B23Q 7/04* (2013.01); *B23B 13/02* (2013.01); *B23C 1/12* (2013.01); *B23Q 2230/002* (2013.01); *B23Q 2703/02* (2013.01); *Y10T 29/5114* (2015.01); *Y10T 409/307672* (2015.01); *Y10T 483/10* (2015.01); *Y10T 483/16* (2015.01); *Y10T 483/1705* (2015.01); *Y10T 483/1726* (2015.01); *Y10T 483/1795* (2015.01)

(58) Field of Classification Search
CPC .............. B23Q 7/047; B23Q 2230/002; B23Q 3/155–15793
USPC ................. 483/14, 18, 20; 29/27 R, 27 C
See application file for complete search history.

(56) References Cited

U.S. PATENT DOCUMENTS

| | | | | |
|---|---|---|---|---|
| 5,964,016 | A | * | 10/1999 | Ito .............................. B23C 3/18 279/14 |
| 6,131,259 | A | | 10/2000 | Stark et al. |
| 6,836,941 | B2 | * | 1/2005 | Prust ....................... B23Q 1/623 29/27 C |
| 7,507,193 | B2 | | 3/2009 | Prust et al. |
| 8,092,357 | B1 | * | 1/2012 | Buus ........................ B23B 39/06 483/41 |
| 8,529,419 | B2 | * | 9/2013 | Kawasumi ............... B23B 3/065 29/27 R |

FOREIGN PATENT DOCUMENTS

| | | |
|---|---|---|
| DE | 19916765 A1 | 10/2000 |
| DE | 10005338 A1 | 8/2001 |
| DE | 20306220 U1 | 6/2003 |
| EP | 1743736 A2 | 1/2007 |
| JP | 61-226242 A * | 10/1986 |
| WO | WO 98/08648 | 3/1998 |

* cited by examiner

METHOD FOR MACHINING WORKPIECES AND MACHINE TOOL FOR CARRYING OUT THE METHOD

RELATED APPLICATION

This application claims priority to German patent application DE 10 2017 115 734.4, filed Jul. 13, 2017, which is incorporated herein by reference.

BACKGROUND OF THE INVENTION

Field of the Invention

The present invention relates to a machine tool having a clamping device for clamping in workpieces to be machined, having a work spindle which can be moved relative to the clamping device, and a tool magazine in which tools for machining the workpieces are held available, wherein the tools can be selectively clamped into the work spindle.

The present invention further relates to a method for machining workpieces on such machine tools, comprising the following steps:
a) clamping a workpiece into the clamping device in such a way that at least one workpiece portion of the workpiece projects beyond the clamping device, said workpiece portion being to be machined,
b) machining the workpiece portion with at least one tool clamped into the work spindle,
c) separating the machined workpiece portion from the residual workpiece remaining in the clamping device, and
f) disposing of the residual workpiece remaining in the clamping device as a remnant.

Related Prior Art

Such machine tools are known for example from WO 98/08648 A1 or DE 42 28 708 A1. The known method is carried out on the known machine tools.

Such machine tools are used for the series machining of workpieces which, for example as blanks, are clamped individually into the clamping device in succession and machined. Although, in this clamped-in arrangement, the workpiece portion projecting beyond the clamping device can be machined on all sides, machining of the residual workpiece which is clamped into the clamping device is thus not possible.

The partially machined workpiece is therefore removed from the clamping device and is clamped either into the same or into a further clamping device, with the result that the residual workpiece can be machined.

It is also known that the partially machined workpiece is separated from the residual workpiece and clamped into another clamping device, with the result that it can be machined on its side separated from the residual workpiece.

This method is used for example when, for clamping the workpiece into the clamping device, the residual workpiece to be clamped in has to have a specific outer contour. The residual workpiece which remains in the clamping device after the separation of the partially machined workpiece is disposed of as a remnant.

However, this method is used in particular when a plurality of workpieces are machined in succession from a workpiece bar.

On or in the vicinity of a machine tool equipped to carry out this method, as is known from WO 98/08648 A1 or DE 42 28 708 A1 mentioned at the outset, there is provided a magazine for workpiece bars or bar portions which are inserted in succession into a clamping device. Each workpiece bar is inserted into the clamping device to such an extent that it projects—in the region of the workspace of the machine tool—beyond the clamping device at least by a workpiece portion, which completely or partially corresponds to the workpiece to be produced.

The portion corresponding to a workpiece to be produced—also designated as workpiece portion below—is machined with the aid of tools which can be clamped into the work spindle. For this purpose, the workpiece bar and/or the work spindle can be pivoted in order also to be able to machine the end side of the workpiece portion and for example to incorporate oblique bores.

As soon as all the machining operations have been performed on the workpiece portion, this workpiece portion is separated from the workpiece bar and guided into a collection container, for example via a chute. In other cases, prior to the separation from the workpiece bar, the workpiece portion is gripped by a device which can be moved in the longitudinal direction of the workpiece bar and in which the workpiece portion remains after separation, with the result that it can also still be machined on its side now separated from the residual workpiece, that is to say the residual workpiece bar.

In many cases, there is provided a handling system by means of which the finished workpieces, that is to say the finished parts, are deposited in a defined manner on a pallet.

The workpiece bar situated in the clamping device is advanced in a suitable manner from the rear through the clamping device, for example by a piston-cylinder unit which is in bearing contact with the rear end of the workpiece bar. Also conceivable, however, are transport systems which grip the bar at its rear or front end and push or pull it in a defined manner through the clamping device.

By virtue of the finite length of the clamping device, the workpiece bar can be pushed in this way through the clamping device and a new workpiece can be machined only until a residual workpiece bar remains which is no longer of such length that, on the one hand, it can be securely clamped in and, on the other hand, still projects with a workpiece portion of sufficient length from the clamping device.

This residual workpiece bar must then be disposed of as a remnant, which leads again and again to problems. Since the workpiece bars frequently consist of valuable material, it must moreover be ensured that the remnants can be recycled in a simple and cost-effective manner.

In the case in which the finished parts are passed on via a chute, the possibly considerably longer remnants can jam on the chute, with the result that the machining process has to be interrupted. In addition, the remnants would have to be subsequently separated from the finished parts, which requires additional work steps.

It is also problematic if the remnants are disposed of together with the chips since the remnants can wedge in the chip conveyor, which also leads to a standstill of the machine tool. In addition, the remnants would have to be subsequently separated from and cleaned of the chips, which requires additional work steps.

The disposal of the remnants is also problematic in those machine tools which have a handling system for the finished parts, that is to say grip them by a gripper and deposit them in a defined manner, for example on a pallet. If the remnants are not intended to be subsequently separated out from the finished parts, a separate depositing space must be provided for them, which requires complex handling systems. In addition, the finished parts as a rule have other geometries than the remnants, with the result that the latter cannot be gripped securely, if at all, by the gripper for the finished parts.

DE 203 06 220 U1 describes a machine tool of the type mentioned at the outset in which a workpiece transport system with a slide serves for supplying blanks and for transporting away finished parts; the handling of remnants is not mentioned.

In the known machine tool, the finished parts are removed from the clamping device by a spindle gripper which can be inserted into the tool receptacle of the work spindle and are set down on the slide, whereupon a blank is removed from the same slide and is inserted into the clamping device.

For the spindle gripper, the slide has arranged thereon a receiving holder from which the work spindle removes the spindle gripper by the pick-up process. The spindle gripper has two gripping arms which are actuated by means of a hydraulic, electric or pneumatic supply line which is here connected to the slide.

Spindle grippers are also known for example from DE 3620343 C2 or DE 19916765 A1. These are understood to be workpiece grippers which are designed to be received into the tool receptacle of a work spindle. The travelling movement necessary for transporting the workpiece is then realized by the work spindle.

If a workpiece is intended to be transported or transferred, the spindle gripper is exchanged into the work spindle from a tool magazine or a specific gripper magazine in the machine, specifically either by the so-called pick-up process or by a specific gripper arm.

In order not to excessively limit the receiving capacity of the tool magazine, according to DE 3620343 C2 a specific gripper magazine is provided within the work region of the tool spindle, although this leads to a limitation of the workspace on account of the large space requirement in the known machine tool.

By contrast, DE 19916765 A1 proposes a spindle gripper which can be folded in and which, in the folded-in state, can be deposited in the tool magazine in a space-saving manner, for which purpose, however, a high technical outlay is required, which leads to high costs.

EP 1 743 736 A2 likewise describes a machine tool of the type mentioned at the outset in which a workpiece gripper is fixedly arranged on the outside of the spindle head, i.e. it is not moved out of the workspace nor is it inserted into the tool receptacle of the work spindle.

SUMMARY OF THE INVENTION

In view of the above, it is one object of the present invention to develop the known method and the known machine tool in such a way that a secure and rapid operation of the machine tool is possible with a structurally simple design.

In the method stated at the outset, this and other objects are achieved in that step f) comprises the following steps:
g) clamping a spindle gripper, which is self-holding in its gripping position, into the work spindle,
h) moving the work spindle in such a way that the spindle gripper can grip the remnant,
i) gripping the remnant by the spindle gripper,
k) releasing the remnant from the clamping device, and
l) moving the work spindle and depositing the spindle gripper holding the remnant for the subsequent disposal of the remnant, wherein, in step g), the work spindle preferably takes the spindle gripper out of the tool magazine at a transfer position and, in step l), the spindle gripper holding the remnant is returned into the tool magazine at the transfer position.

According to one object, the workpiece is a workpiece bar, wherein the following steps are carried out between the steps c) and f):
d) advancing the residual workpiece bar until at least one new workpiece portion projects beyond the clamping device, and again clamping in the residual workpiece bar, and
e) repeating the steps b) to d) until a residual workpiece bar results which is unsuitable for further machining and which is then disposed of as a remnant in step f).

In the machine tool stated at the outset, a further object is achieved according to the invention in that a spindle gripper which can be selectively clamped into the work spindle and which is self-holding in its gripping position is held available in the tool magazine and can be moved between a transfer position to the work spindle and an unloading station in which the spindle gripper releases a remnant received from the clamping device.

The inventors of the present invention have recognized that the remnant can be disposed of in a simple manner by a spindle gripper which is self-holding in its gripping position and which can be deposited from the work spindle while said gripper still holds the remnant.

In the context of the present invention, a "self-holding" spindle gripper is understood to mean a spindle gripper which captively holds a received remnant even when it is deposited from the work spindle into the tool magazine and moved within the tool magazine. For this purpose, the spindle gripper can contain for example a closing spring, a shell, which is suitably opened as required, a locking mechanism for gripper jaws, a self-locking gear mechanism or similarly suitable measures which ensure that a remnant once received by the spindle gripper is not involuntarily released again.

This offers, on the one hand, time advantages since the work spindle does not have to move first to a depositing location for the remnant and then to a depositing location for the spindle gripper; all that is required is one travelling movement in order to deposit both the spindle gripper and the remnant.

The invention—according to some objects—offers structural advantages since two depositing locations, one for the spindle gripper and one for the remnant, do not have to be provided in the machine tool. This also reduces the space requirement in the travelling region of the work spindle, that is to say in the workspace.

Finally, the problems in the remnant handling mentioned at the outset are also eliminated. The remnant is securely held by the deposited spindle gripper which is then moved by suitable means to the depositing location for the remnant, whereas, after receiving a new tool by the tool magazine, the work spindle already moves again towards the clamping device in order to begin the machining of the next workpiece.

Other advantages are obtained and objects are achieved, if the spindle gripper is stored in the tool magazine since the work spindle does not have to move to a completely new position in the workspace after depositing a tool in order to receive the spindle gripper or after depositing the spindle gripper holding the remnant in order to receive a new tool. Either the work spindle, after depositing the tool/spindle gripper, moves to the next storage space of the tool magazine, or the tool magazine advances by one storage space.

These measures thus ensure further time advantages and still further reduce the space requirement in a structurally simple manner.

The new method and the new machine tool can according to a further object be used both for machining blanks clamped individually and in succession into the clamping device and for machining workpieces from a workpiece bar pushed successively through the clamping device.

According to another object, the new method can also be carried out on existing machine tools; there merely has to be provided a self-holding spindle gripper in the tool magazine and the control has to be designed such that the spindle gripper holding a remnant is moved to the unloading station while the work spindle can simultaneously start the machining of a new workpiece.

According to one object, this can be achieved for example by a device which removes the spindle gripper from the tool magazine and moves it to the unloading station, where an opening mechanism is provided which opens the self-holding spindle gripper, with the result that it releases the remnant. The device then brings the spindle gripper again into the tool magazine.

According to another object, this can also be achieved by the tool magazine itself, which merely has to move a new tool into the transfer position during the time period for the successive machining of workpieces but is otherwise not in use. For this purpose, it is required to provide the unloading station for the remnants in the tool magazine and to deposit the spindle gripper holding the remnant at the customary transfer position between work spindle and tool magazine in the latter.

According to one object, the spindle gripper returned into the tool magazine and holding the remnant is moved by the tool magazine from the transfer position to an unloading station in which the spindle gripper releases the remnant.

According to a further object, the spindle gripper is prestressed by a closing spring into its gripping position or—as in the case of a shell—into its closing position in which it captively holds a received remnant.

It is advantageous here that, for gripping and holding a workpiece, no media connection is required on the work spindle, although this can offer advantages in handling. The spindle gripper can be designed such that it can be pushed as it were by the work spindle onto the remnant, with its gripper jaws at first spreading and sliding over the surface of the remnant until they engage behind the remnant or engage in cutouts in the remnant. The spindle gripper is then prestressed into this gripping position by the closing spring. A device is then provided in the unloading station in order to open the gripper jaws of the spindle gripper again.

For this purpose, the spindle gripper can according to still another object have a mechanically actuatable release bolt upon the actuation of which the spindle gripper can be transferred into its release position against the force of the closing spring, wherein the unloading station is assigned an actuating member which, with the spindle gripper situated in the unloading station, serves for actuating the release bolt.

It is advantageous here that the spindle gripper requires no media connections; the gripping and holding of a remnant is brought about solely by the closing spring, whereas in the unloading station the release is achieved by actuating the release bolt. This allows a simple design and the problem-free retrofitting of existing machine tools.

According to a still further object, the spindle gripper has a first media connection which can be connected to a first media supply related to the work spindle, so that, when the first media connection is supplied with a medium from the first media supply, the spindle gripper is transferred between its gripping position and its release position, wherein, with further preference, when the spindle gripper is clamped into the work spindle, the first media connection is automatically connected to the first media supply.

The spindle gripper clamped into the work spindle can thus be actively opened for example against the force of a closing spring which then closes the gripper in its gripping position after it is pushed onto the remnant.

According to one object, the spindle gripper has between its gripper jaws a gear mechanism which is self-locking in the gripping position, so that it can be actively closed via the media connection.

It is advantageous here that the spindle gripper is opened and/or closed in a secure manner, wherein use can be made of the customary media which are available in a work spindle, that is to say compressed air, cooling lubricant, electric current or hydraulic oil.

According to one object, the spindle gripper has a second media connection which can be connected to a second media supply related to the tool magazine, so that, when the second media connection is supplied with a medium from the second media supply, the spindle gripper is transferred from its gripping position into its release position, wherein, preferably with the spindle gripper situated in the unloading station, the second media connection is preferably automatically connected to the second media supply. It is particularly preferable if the second media connection is the first media connection.

It is advantageous here that the opening mechanism which is used for gripping the remnant and which operates for example against the force of the closing spring can also be used analogously in the unloading station. This results in a simply designed spindle gripper.

According to another object, the spindle gripper has a self-locking gear mechanism which acts between two gripper jaws, a first media connection which can be connected to a first media supply related to the work spindle, and a second media connection which can be connected to a second media supply provided at the unloading station, so that, when the first media connection is supplied with a medium from the first media connection, the spindle gripper is transferred into its gripping position, and, when the second media connection is supplied with a medium from the second media supply, the spindle gripper is transferred into its release position.

The spindle gripper can according a further object be equipped with a self-locking gear mechanism which acts between two gripper jaws which are closed via a first media connection and opened via a second media connection but remain without media action in the adopted state.

Further advantages and objects will emerge from the description and the appended drawing.

It will be understood that the features mentioned above and those still to be explained below can be used not only in the combinations specified in each case but also in other combinations or on their own without departing from the scope of the present invention.

BRIEF DESCRIPTION OF THE DRAWINGS

Embodiments of the invention are illustrated in the drawing and are explained in more detail in the following description. In the drawing.

DESCRIPTION OF PREFERRED EMBODIMENTS

Figure 1:
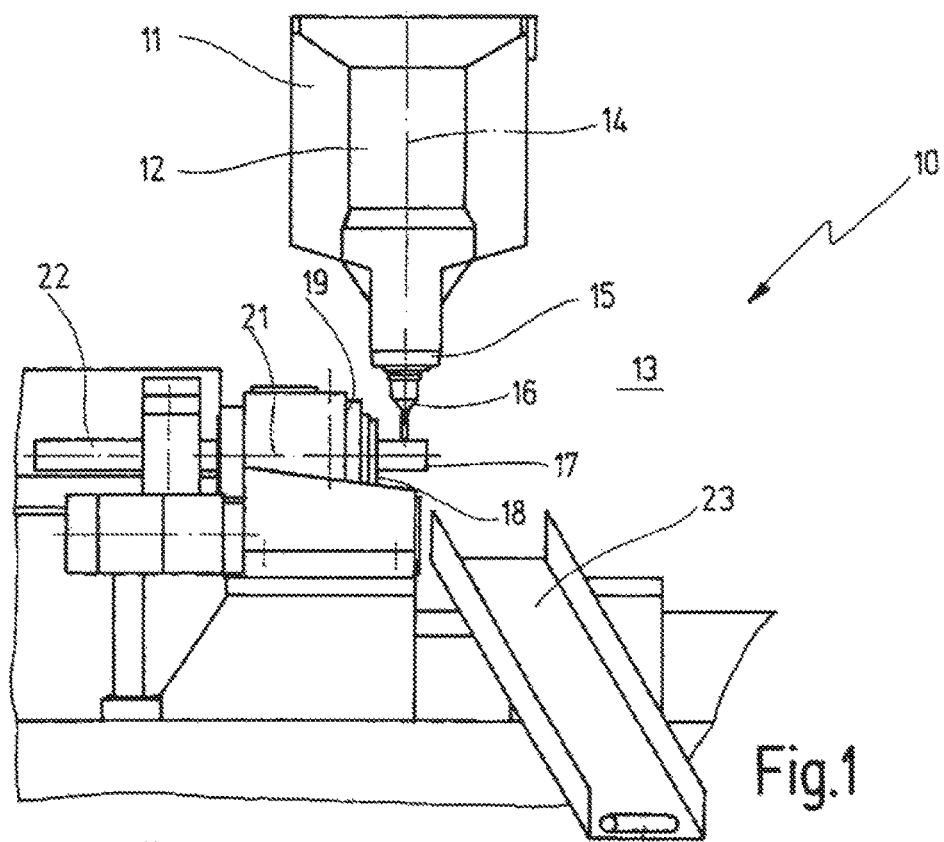
FIG. 1 shows a first embodiment of a machine tool on which the method according to the invention can be carried out.

In FIG. 1, a machine tool is designated by 10, with a spindle head 12 being mounted height-adjustably on its travelling column 11. The spindle head 12 can in this way be moved in all three spatial directions in a workspace 13.

The invention can also be realized in a portal or gantry machine. It is also possible to realize only two axes in the spindle head 12 and the third in a clamping device for the workpieces.

The spindle head 12 bears a work spindle 15 rotatably driven about a spindle axis 14 and into which different tools 16 can be clamped in a customary manner in order to machine workpiece portions 17 which are clamped into a clamping device 18.

The clamping device 18 is connected to a rotary drive 19 in order to rotate the workpiece portions 17 about an axis of rotation 21, with the result that the workpiece portions 17 can be machined on their four longitudinal sides. It is also possible to set the workpiece portions 17 in rotation with the aid of the rotary drive such that a turning operation is possible, in which case a tool 16 suitable for the turning operation is inserted into the vertical work spindle 15. In this way, the machine tool 10 can be used both for a milling operation and for a turning operation of workpiece portions 17.

The workpiece portions 17, then, are machined from a workpiece bar 22 which is pushed from the rear through the clamping device 18, with the result that at least the workpiece portion 17 projects at its front end into the workspace 13 and can be machined there. Here, the workpiece bar 22 can have any desired cross-sectional shapes to which the clamping device 18 is correspondingly adapted.

If a workpiece portion 17 is finish-machined, it is separated from the workpiece bar 22 by a suitable tool 16 or else a separately provided chop saw and removed from the workspace 13 via a chute 23. In FIG. 1, a finish-machined workpiece 24 is indicated at the bottom of the chute.

Figure 2:
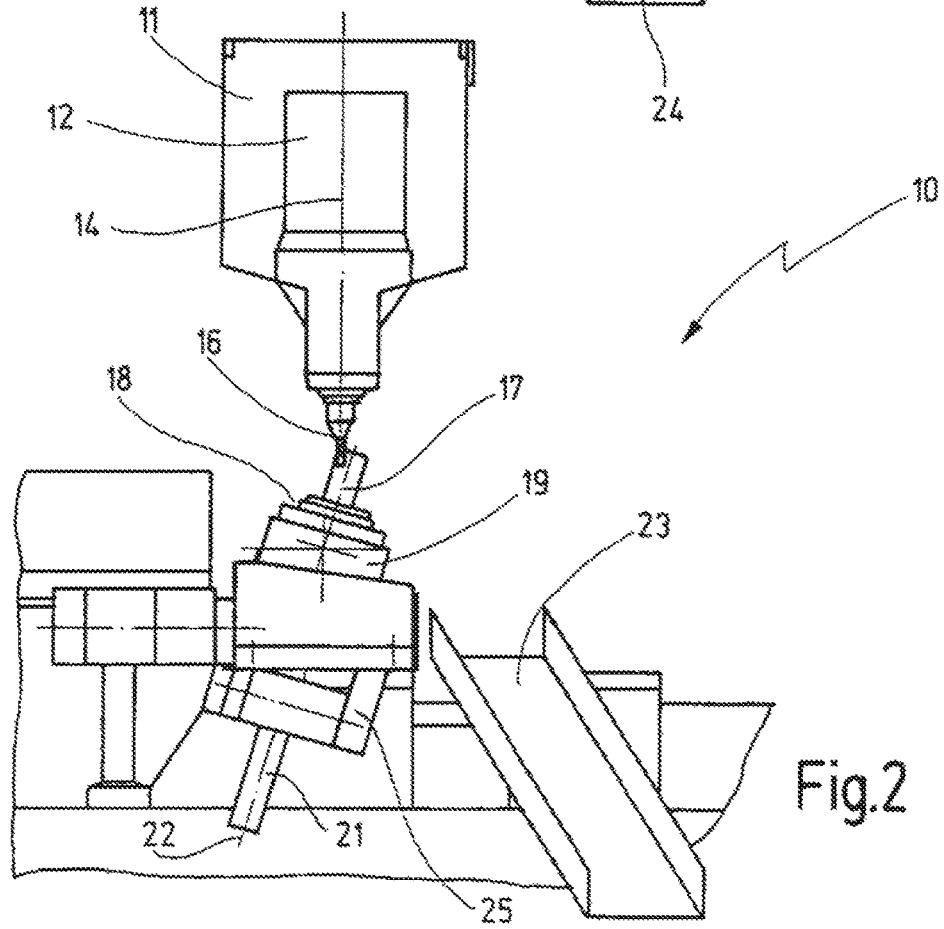
FIG. 2 shows an illustration as in FIG. 1, but with a pivoted clamping device.

In order to be able to machine the end side of the workpiece portion 17, the clamping device 18 is mounted on a pivoting holder 25 which can be seen in FIG. 2 and by means of which the axis of rotation 21 can be pivoted to such an extent until it is virtually in alignment with the spindle axis 14.

Figure 3:
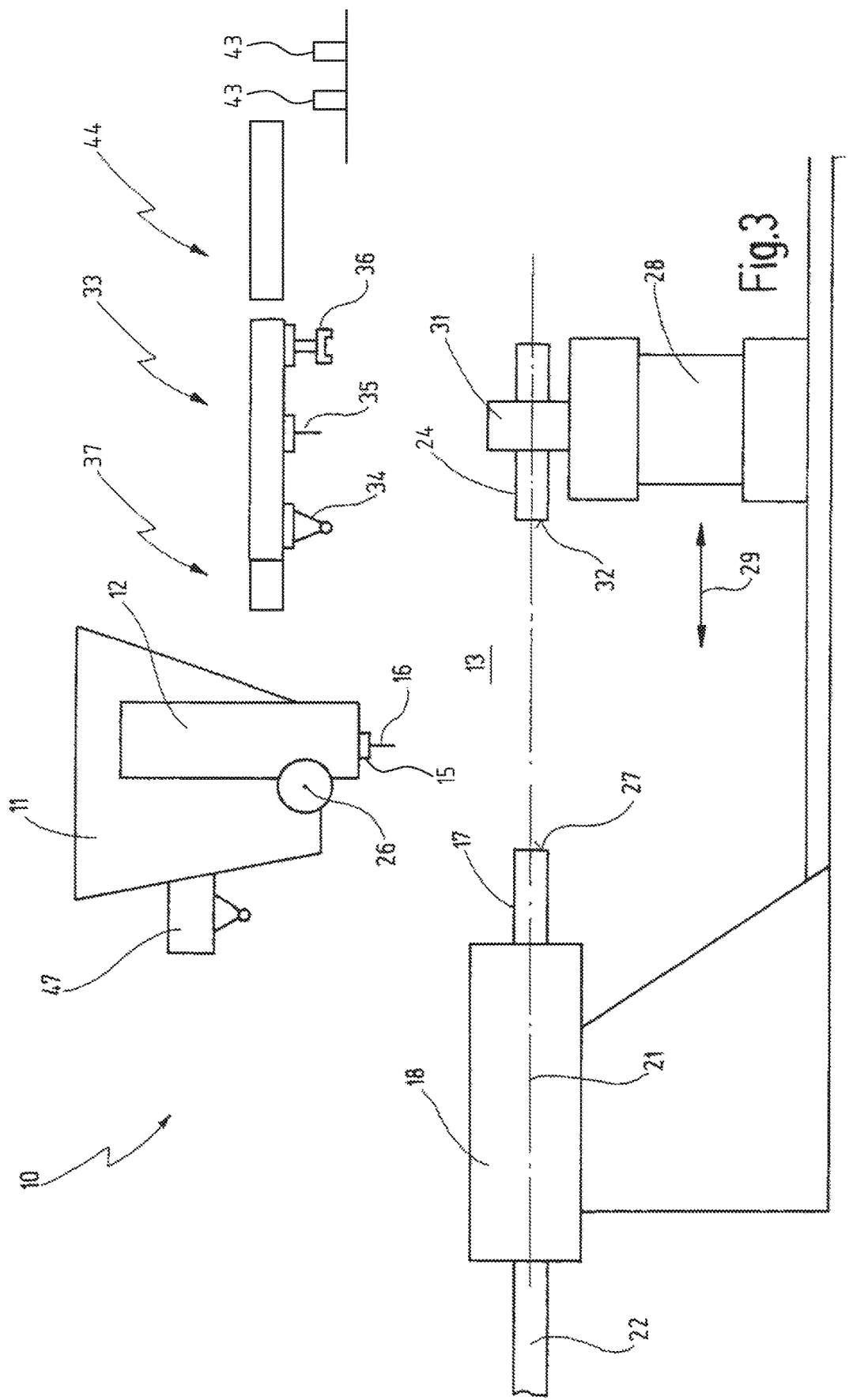
FIG. 3 shows a further embodiment of a machine tool on which the method according to the invention can be carried out, in a schematic side view.

Alternatively or additionally to the clamping device 18, the spindle head 12 can also be designed to be pivotable, as is now explained in conjunction with FIG. 3.

The machine tool 10 from FIG. 3 is likewise only schematically illustrated; it again comprises the travelling column 11 and the spindle head 12 which can now be pivoted in the workspace 13 about an axis of rotation indicated at 26, in order to be able to machine the workpiece portion 17 at its end side 27.

In addition to the clamping device 18, there is provided in the machine tool 10 a device 28 which is displaceable in the direction of the axis of rotation 21, which is indicated by an arrow 29.

The device 28 has a clamping unit 31 into which a partially machined workpiece 24 can be clamped. In this way, the workpiece portion 17 is also accessible for machining by a machining tool 16 on its sixth side 32 now separated from the residual workpiece bar 22.

Next to the travelling column 11, there is provided a schematically indicated tool magazine 33 in which various tools 34, 35 and a self-holding spindle gripper 36 are held available, with it being possible for these to be selectively inserted into the work spindle 15.

For this purpose, the relevant tool 34, 35 or the spindle gripper 36 is moved into the transfer position designated by 37 in FIG. 3. In FIG. 3, the transfer position 37 is not occupied by a tool 34, 35 because an empty space of the tool magazine 33 is situated there for the prior depositing of the tool 16 clamped into the work spindle 15.

After the tool 16 has been deposited in the tool magazine 33, the latter moves a new tool 34, 35 into the transfer position 37, where it is received by the waiting work spindle 15.

Figure 4:
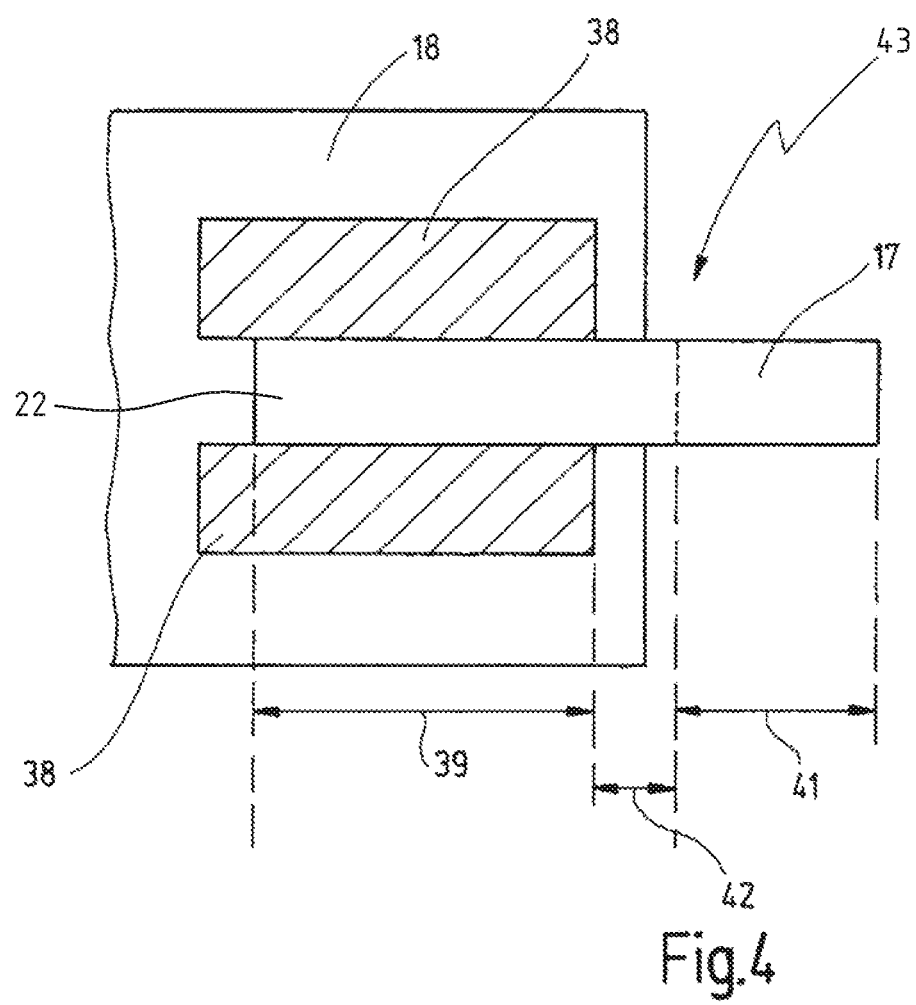
FIG. 4 shows a schematic illustration of the clamping device with a clamped-in remnant.

Workpiece portions 17 are now successively machined and separated from a workpiece bar 22 by means of the tools 16, 34, 35, with the result that the residual workpiece bar 22 becomes ever shorter. This situation of clamping into the clamping device 18 is schematically shown in FIG. 4.

The residual workpiece bar 22 is held by for example two clamping jaws 38 in which it is held by its rear portion with a minimum clamping length which is indicated at 39. Were the workpiece bar 22 to be seated with a shorter portion in the clamping jaws 38, it would no longer be sufficiently securely held.

The total length of the residual workpiece bar 22 is composed of this minimum clamping length 39, of the length, indicated at 41, of the workpiece portion 17 projecting beyond the clamping device 18 into the workspace and of an overhang 42 by which the workpiece portion 43 must project beyond the clamping jaws 38 in order to be able to be machined securely in the workspace 13.

If the length 41 of the workpiece portion 17 is shorter than the length of a workpiece 24 to be produced, the residual workpiece bar 22 is disposed of as a remnant 43.

For this purpose, the work spindle 15 is moved into its transfer position 37 to the tool magazine 33 where it deposits the currently held tool 16, 34, 35, whereupon the tool magazine 33 has then moved the self-holding spindle gripper 36 into the transfer position 37 which is clamped there into the work spindle 15 by the pick-up process. The work spindle 15 then approaches the clamping device 18 such that the spindle gripper 36 can grip the remnant 43 which is then released from the clamping device 18.

The work spindle 15 then moves back into the transfer position 37 and again deposits in the tool magazine 33 the spindle gripper 36 holding the remnant 43. The spindle gripper 36 is then moved in the tool magazine 33 to an unloading station indicated at 44 in FIG. 3, where the remnant 43 is deposited.

This operation is now explained in detail with reference to FIGS. 5 to 7 which show perspective, schematic views of the tool magazine 33, of the work spindle 15 and of the clamping device 18 at different stages of the disposal of a remnant 43.

Figure 5:
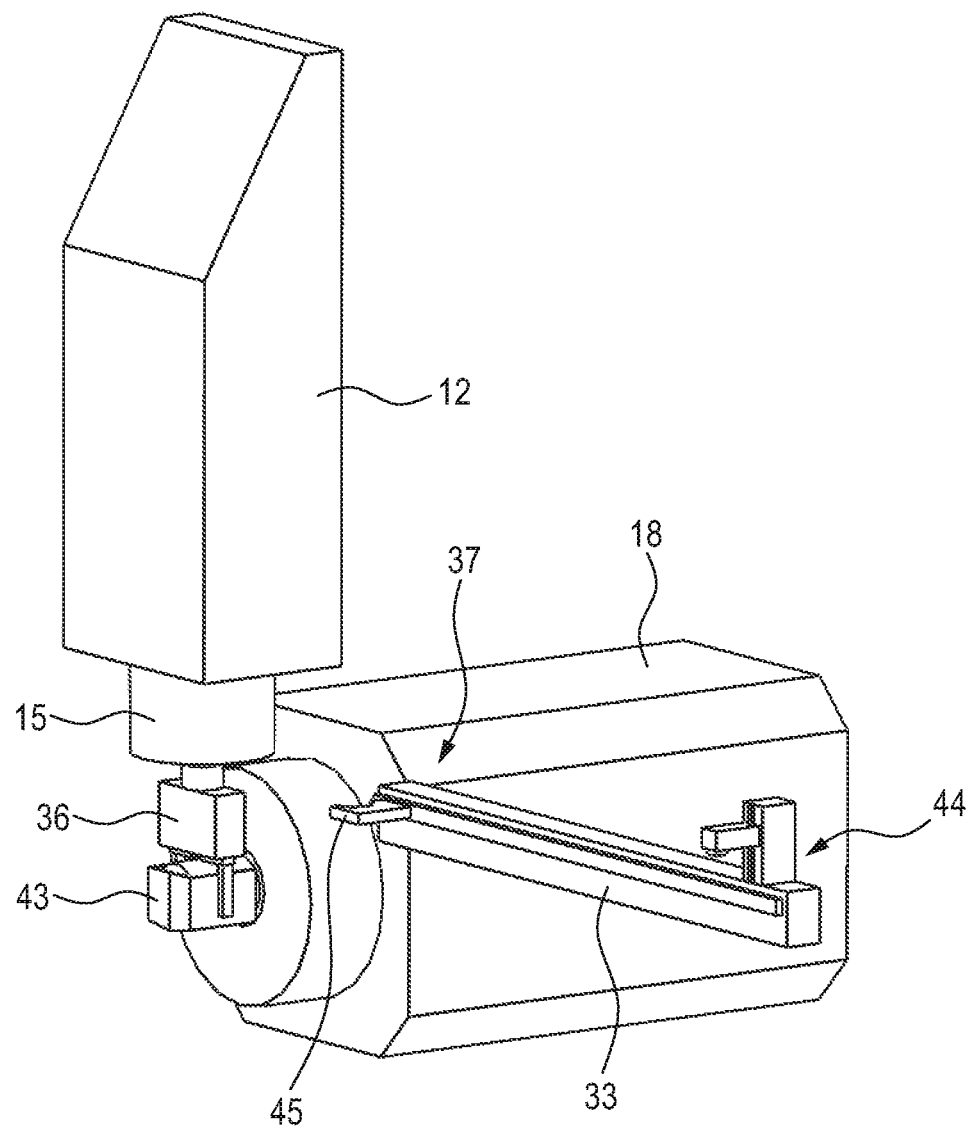
FIGS. 5 to 7 show schematic, perspective views of the tool magazine, of the work spindle and of the clamping device from FIG. 3 at different stages of the disposal of a remnant.

In the method stage of FIG. 5, the spindle gripper 36 is situated in the work spindle 15, wherein the remnant 43 is still held in the clamping device 18. The spindle gripper 36 has already gripped the remnant 43, which is now released from the clamping device 18. The spindle head 12 now moves the work spindle 15 into the transfer position 37 on the tool magazine 33, which is merely schematically indicated as a linear transport path in FIGS. 5 to 7.

Figure 6:
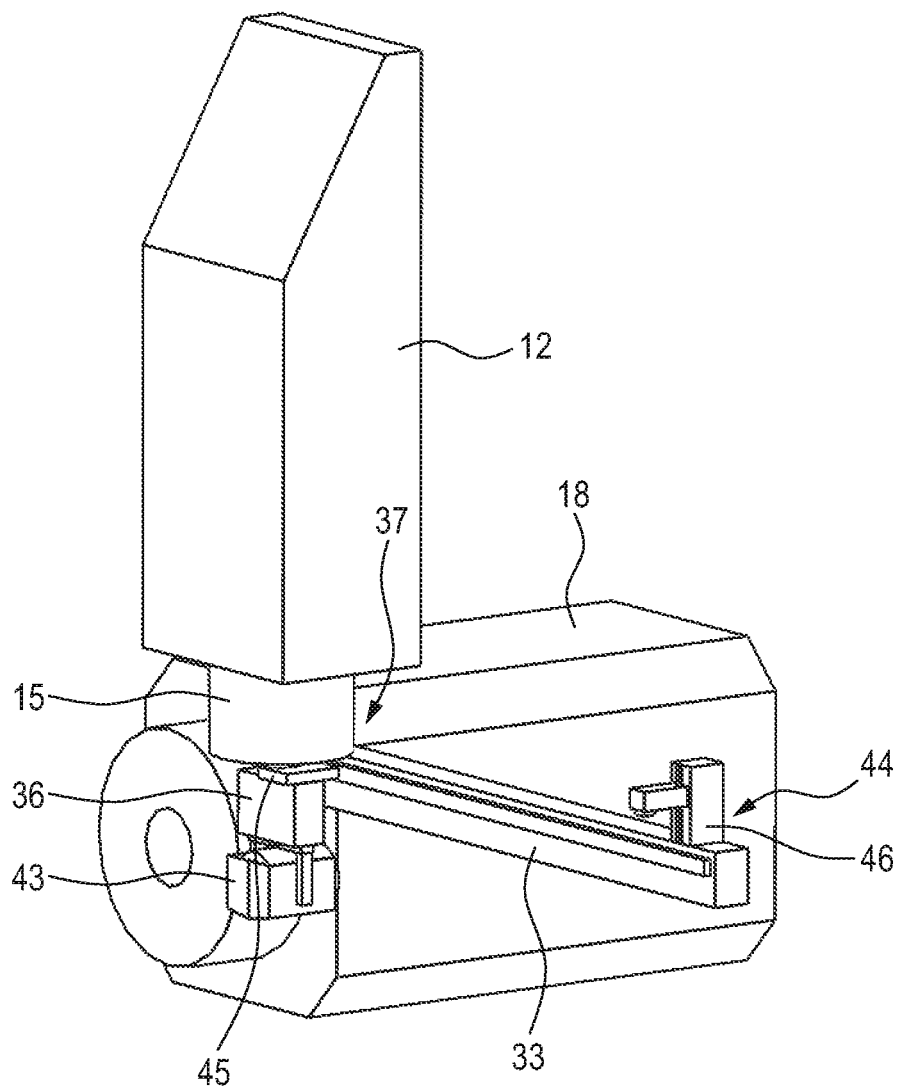
Figure 7:
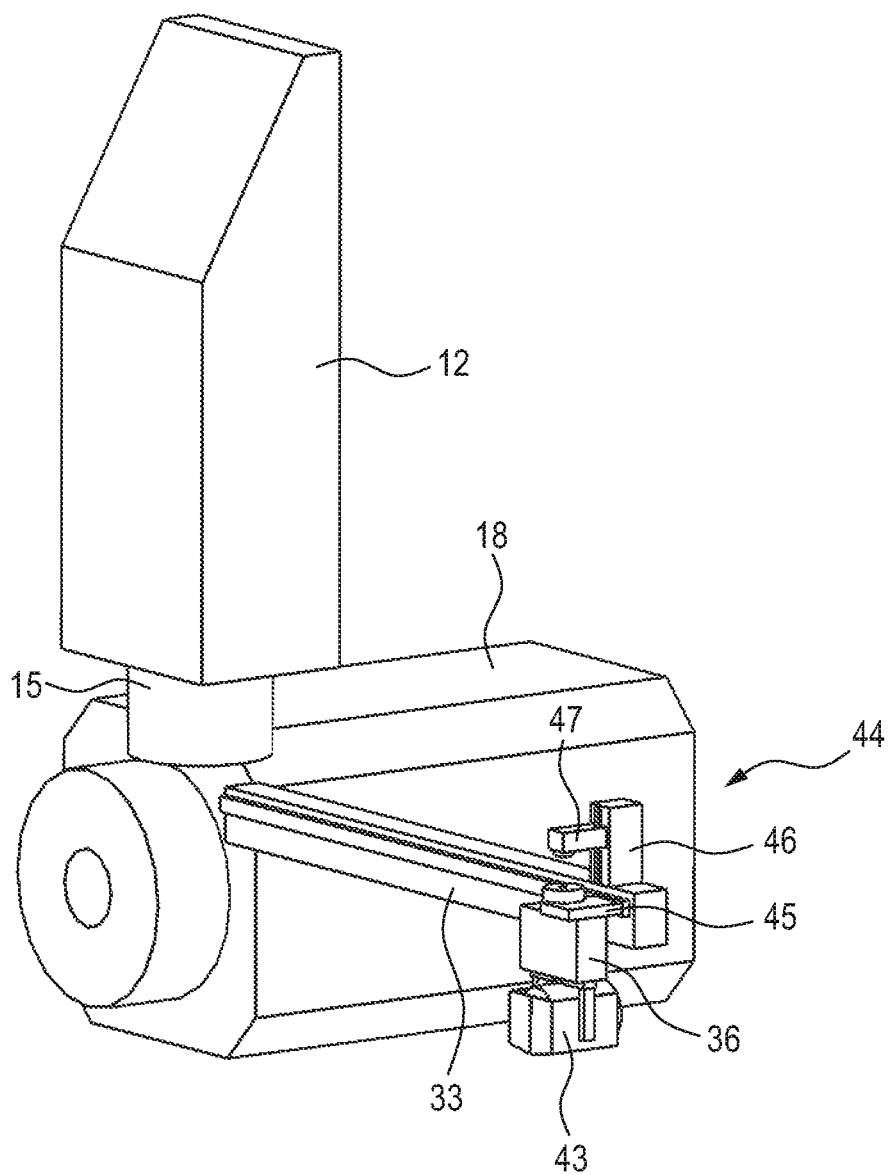

In the transfer position 37, the tool magazine 33 holds ready an empty holder 45 into which the spindle gripper 36 holding the remnant 43 is now deposited, as shown in FIG. 6. The holder 45 is then moved by the tool magazine 33 into the unloading station 44, as is shown in FIG. 7.

In the unloading station 44 there is provided a release unit 46 which has a height-adjustable arm 47 which is now applied from above to the spindle gripper 36 in order to release the held remnant 37.

Figure 8:
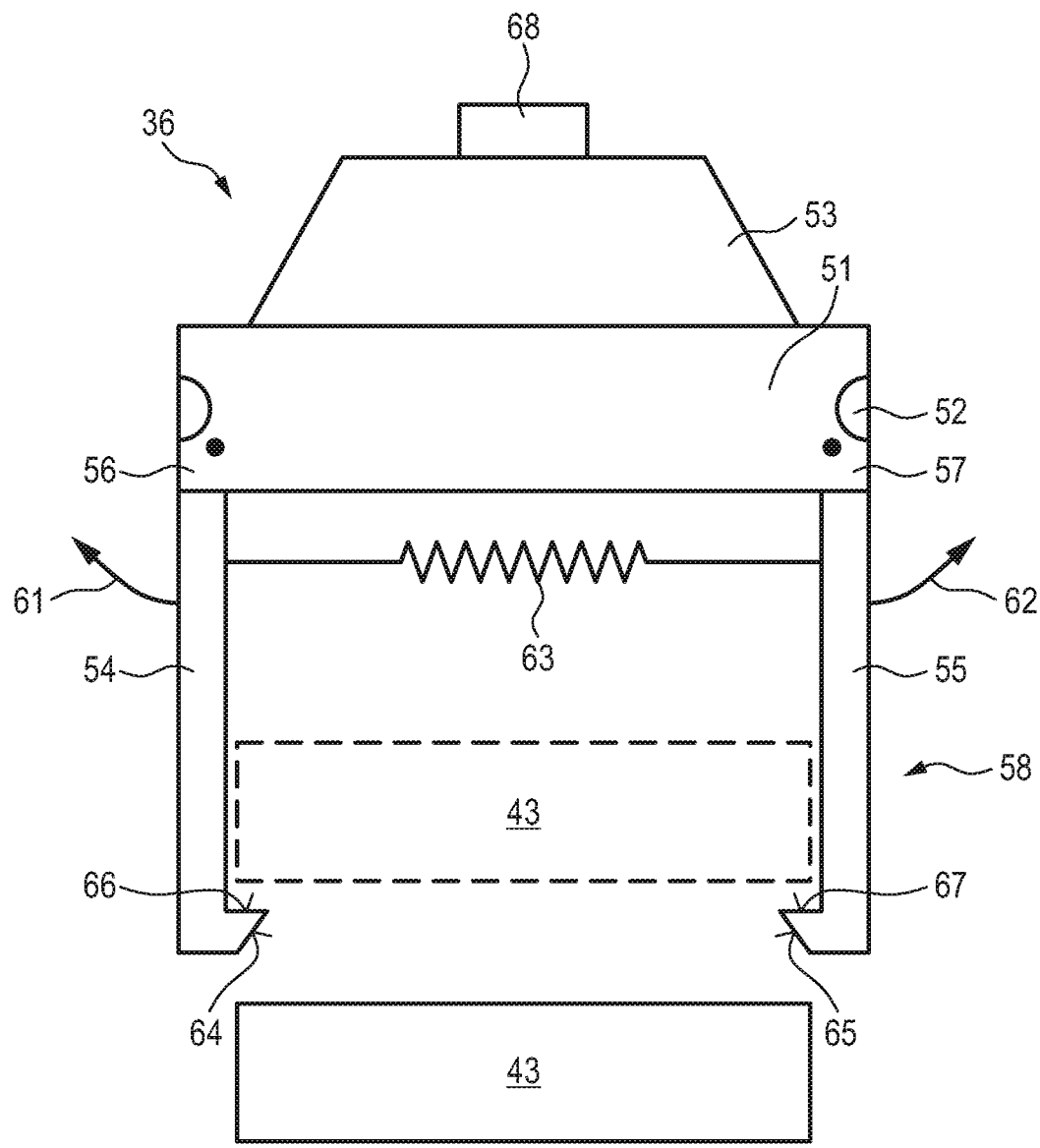
FIG. 8 shows a schematic side view of a spindle gripper in the gripping position.

FIG. 8 shows in a schematic side view a first embodiment of the spindle gripper 36 which has a gripper plate 51, which is customary for tool holders, with a peripheral groove 52 on which the spindle gripper 36 is held by the holder 45 in a manner known per se for SK or HSK tool holders, for example.

On the top of the gripper plate 51 there is seated a holding cone 53 by means of which the spindle gripper 36 is inserted and clamped as, for example, SK or HSK tool holders into a tool receptacle in the end side of the work spindle 15.

Figure 9:
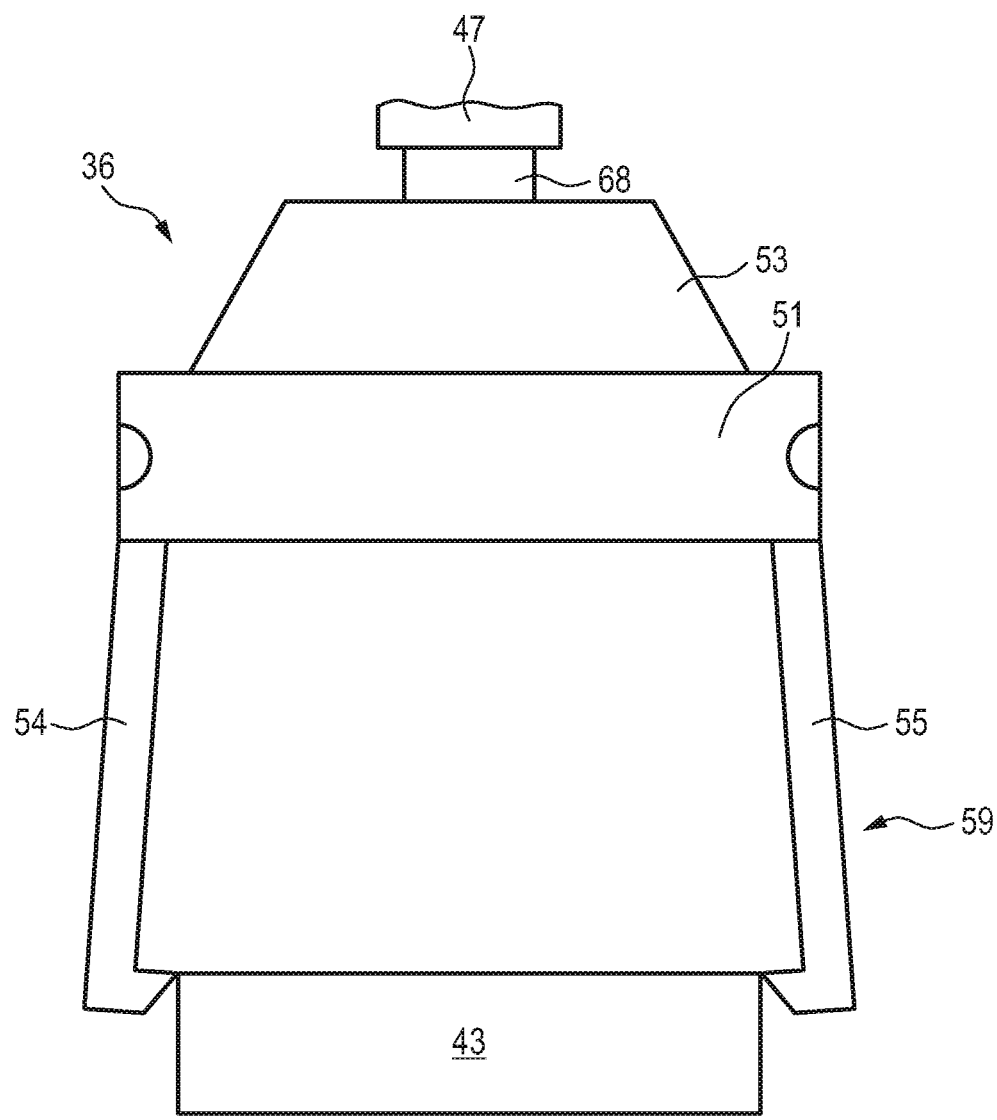
FIG. 9 shows a schematic side view of a spindle gripper in the release position.

At the bottom of the gripper plate 51 are arranged two gripper jaws 54, 55 which can be pivoted about axes 56, 57 between the gripping position 58 shown in FIG. 8 and the release position 59 shown in FIG. 9, which is indicated by arrows 61, 62. The gripper jaws 54, 55 are prestressed into their gripping position 58 by a closing spring indicated at 63.

At the bottom of the free ends of the gripper jaws 54, 55 there are formed bevelled surfaces 64, 65 which, when the spindle gripper 36 is pushed onto a remnant 43, slide along the latter and press the gripper jaws 54, 55 outwards, with the result that they pivot into the release position 59 and let through the remnant 43 between them.

If the remnant 43 releases the surfaces 64, 65 again, the gripper jaws 54, 55 pivot back into their gripping position 58 in which the remnant illustrated in dashed lines in FIG. 8 is held securely on planar surfaces 66, 67 of the gripper jaws 54, 55.

In this way, a spindle gripper 36 clamped into the work spindle 15 grips a remnant 43 clamped into the clamping device 18.

At the top of the holding cone 53 there can be seen a release bolt 68 which, with the spindle gripper 36 situated in the unloading station 44, is actuated by the arm 47 of the release unit 46, with the result that the gripper jaws 54, 55 pivot into their release position 59 and release the remnant 43.

Figure 10:
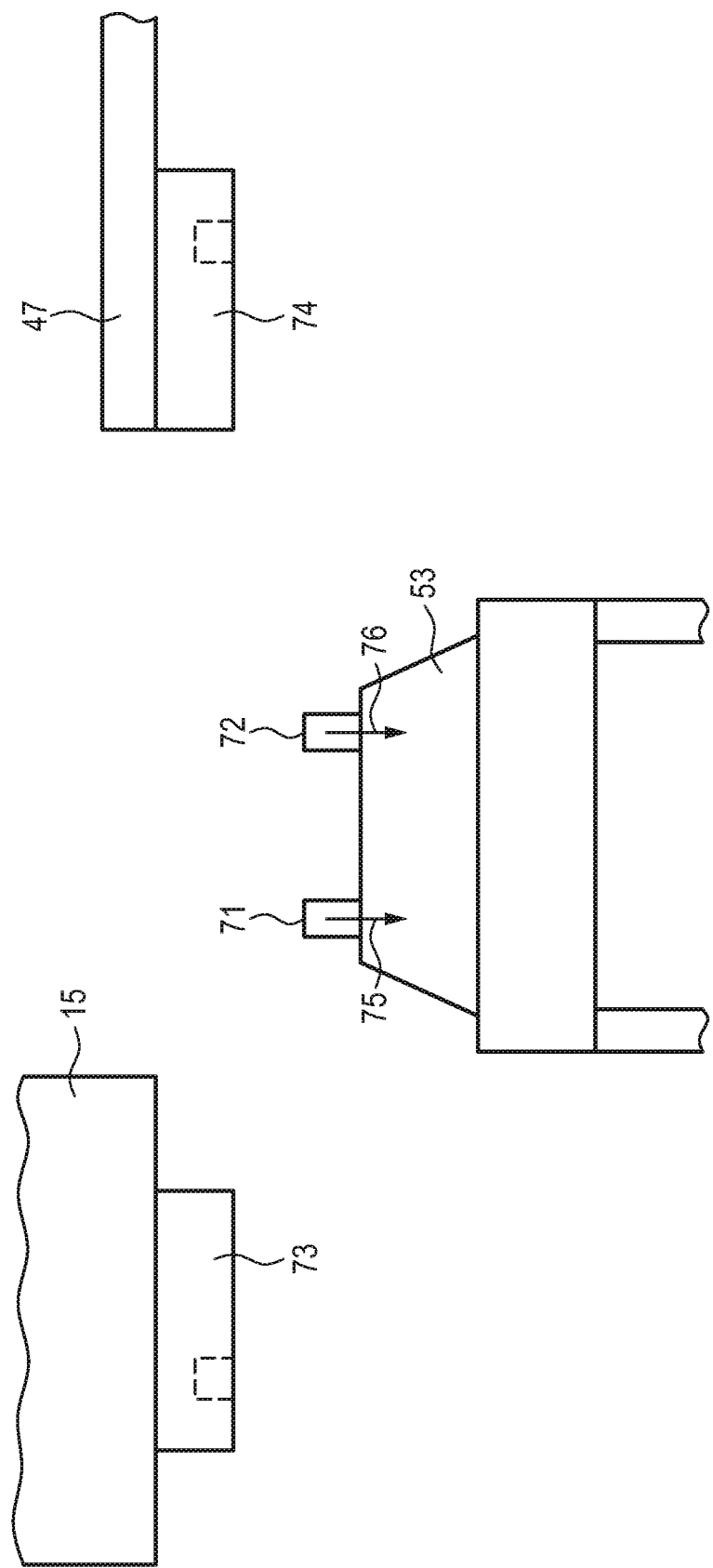
FIG. 10 shows, in a schematic illustration, the interaction of media connections on a spindle gripper and media supplies in the work spindle and in the tool magazine.

Alternatively, the spindle gripper 36 can also be provided on the holding cone 53 with two media connections 71, 72 which automatically engage with a media supply 73 in the work spindle 15 or a media supply 74 in the arm 47 if the spindle gripper 36 is clamped into the work spindle 15 or moved into the unloading station 44 and the arm 47 is lowered, as is schematically illustrated in FIG. 10.

This configuration can be selected if the spindle gripper 36 does not have a closing spring 63 but has for example a self-locking gear mechanism between the gripper jaws 54, 55 which holds the gripper jaws 54, 55 in the once-adopted gripping position or release position.

By virtue of the medium 75 channeled into the media connection 71, the gripper jaws 54, 55 are pivoted for example into their gripping position 58 and, by virtue of the medium 76 channeled into the media connection 72, back into their release position 59.

If a combination of closing spring 63 and media connection 72 is selected, only the media connection 72 is required, which pivots the gripper jaws 54, 55 in the unloading station 44, and where appropriate upon receiving a remnant 43 from the clamping device 18, into the release position 59, with the result that the bevelled surfaces 65, 66 can be dispensed with.

Moreover, the arrangement of the closing spring 63 between the gripper jaws 54, 55 and the arrangement of release bolt 68 and media connections 71, 72 on the holding cone 53 is to be understood as merely illustrative; they can also be arranged next to the holding cone 53 on the top of the gripper plate 51 or at an otherwise suitable point on the spindle gripper 36; it is important only that they are accessible for the media supplies 73, 74.

Therefore, what is claimed is:

1. A method for machining workpieces on a machine tool, said machine tool comprising:
    a clamping device for clamping said workpieces,
    a tool magazine for storing a plurality of tools for machining said workpieces,
    a work spindle which is movable relative to said clamping device and into which at least one tool from said plurality of tools can be clamped, and
    a spindle gripper for gripping remnants, which spindle gripper is self-holding when being in its gripping position, said spindle gripper captively holding a received remnant when being in its gripping position,
   said method comprising the steps of:
    a) clamping a workpiece into said clamping device in such a way that at least a workpiece portion of the workpiece projects beyond the clamping device, said workpiece portion being to be machined,
    b) clamping at least one of said plurality of tools into said work spindle and machining said workpiece portion with said at least one tool clamped into said work spindle,
    c) separating the workpiece portion, when machined, from said workpiece such that a residual workpiece remains in the clamping device, and
    f) disposing of the residual workpiece remaining in the clamping device when the residual workpiece is a remnant, by
    g) clamping said spindle gripper into said work spindle,
    h) moving said work spindle in such a way that said spindle gripper can grip said remnant,
    i) gripping said remnant by said spindle gripper,
    j) releasing said remnant from said clamping device, and
    k) moving said work spindle to deposit said spindle gripper holding said remnant for subsequent disposal of the remnant from said spindle gripper.

2. The method of claim 1, wherein in step g) said work spindle is moved into a transfer position relative to said tool magazine and takes said spindle gripper out off said tool magazine, and wherein, in step k), said work spindle is moved into said transfer position and returns said spindle gripper holding the remnant into said tool magazine.

3. The method of claim 2, wherein said spindle gripper when returned into said tool magazine and still holding said remnant is moved by said tool magazine to an unloading station where said spindle gripper releases said remnant.

4. The method of claim 1, wherein said spindle gripper comprises a closing spring that prestresses said spindle gripper into its gripping position.

5. The method of claim 1, wherein said spindle gripper comprises a first media connection that can be connected to a first media supply related to said work spindle, and wherein supplying said first media connection with a medium from said first media supply transfers said spindle gripper between its gripping position and a release position.

6. The method of claim 5, wherein during clamping of said spindle gripper into said work spindle said first media connection is automatically connected to the first media supply.

7. The method of claim 5, wherein said spindle gripper comprises a second media connection that can be connected to a second media supply related to said tool magazine, and wherein supplying said second media connection with a medium from said second media supply transfers said spindle gripper between its gripping position and its release position.

8. The method according of claim 5, wherein a second media supply is related to said tool magazine, and wherein supplying a second media connection with a medium from said second media supply transfers said spindle gripper between its gripping position and its release position, and wherein the second media connection is automatically connected to said second media supply when said spindle gripper is situated in the unloading station.

9. The method of claim 1, wherein said spindle gripper comprises a media connection that can be connected to a media supply related to said tool magazine, and wherein supplying said media connection with a medium from said media supply transfers said spindle gripper between its gripping position and a release position.

10. The method of claim 9, wherein the media connection is automatically connected to the media supply when said spindle gripper is situated in an unloading station.

11. The method of claim 1, wherein said workpiece is a workpiece bar, and wherein the following steps are carried out between the steps c) and f):

d) advancing the residual workpiece bar through said clamping device until at least a new workpiece portion projects beyond the clamping device, and again clamping in the residual workpiece bar, e) repeating steps b) to d) until said residual workpiece bar is unsuitable for further machining, which residual workpiece bar is then disposed of as said remnant in step f).

* * * * *